United States Patent
Funakoshi (10) Patent No.: US 7,162,868 B2
(45) Date of Patent: Jan. 16, 2007

(54) HEAT SHIELD STRUCTURE OF EXHAUST MANIFOLD AND CATALYST

(75) Inventor: Makoto Funakoshi, Hadano (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 11 days.

(21) Appl. No.: 11/061,613

(22) Filed: Feb. 22, 2005

(65) Prior Publication Data

US 2005/0193726 A1  Sep. 8, 2005

(30) Foreign Application Priority Data

Mar. 3, 2004 (JP) .......................... P2004-058557

(51) Int. Cl.
*F01N 7/10* (2006.01)

(52) U.S. Cl. .................. 60/323; 60/272; 60/322; 60/324; 165/52; 165/DIG. 93

(58) Field of Classification Search ................ 60/272, 60/299, 322, 323, 324; 165/51, 52, DIG. 93
See application file for complete search history.

(56) References Cited

U.S. PATENT DOCUMENTS

| | | | | |
|---|---|---|---|---|
| 6,009,706 A * | 1/2000 | Haneda | ........................ | 60/323 |
| 6,018,946 A * | 2/2000 | Matsumoto | .................. | 60/323 |
| 6,230,490 B1 * | 5/2001 | Suzuki et al. | .................. | 60/323 |
| 6,555,070 B1 | 4/2003 | Kruger | | |
| 6,647,715 B1 * | 11/2003 | Farkas | ......................... | 60/323 |
| 6,681,890 B1 | 1/2004 | Chen et al. | | |
| 6,702,062 B1 * | 3/2004 | Kusabiraki et al. | ......... | 181/240 |
| 2002/0184880 A1 | 12/2002 | Chen et al. | | |
| 2003/0080519 A1 | 5/2003 | Kerchner | | |

FOREIGN PATENT DOCUMENTS

| | | |
|---|---|---|
| JP | 11-107772 | 4/1999 |
| JP | 2002-161739 A | 6/2002 |

\* cited by examiner

*Primary Examiner*—Binh Q. Tran
(74) *Attorney, Agent, or Firm*—McDermott Will & Emery LLP (57) ABSTRACT

A heat shield structure of an exhaust manifold and a catalyst has a flange which is provided in a connecting portion connecting the exhaust manifold and catalyst and forms an open channel, an exhaust manifold heat shield member which covers an upper surface of the exhaust manifold, and a catalyst heat shield member which covers an upper surface of the catalyst. In the heat shield structure, an open side of the channel faces to the catalyst's side, a rear end of the exhaust manifold heat shield member is arranged on a vehicle body upper side of an end portion of the flange, and a front end of the catalyst heat shield member is arranged on a vehicle body floor side of the end portion of the flange. By this structure, heat from the exhaust manifold and catalyst can be efficiently released.

4 Claims, 7 Drawing Sheets

HEAT SHIELD STRUCTURE OF EXHAUST MANIFOLD AND CATALYST

BACKGROUND OF THE INVENTION

1. Field of the Invention

The present invention relates to a heat shield structure of an exhaust manifold and a catalyst of an engine of a vehicle or the like.

2. Description of the Related Art

In a vehicle or the like, an exhaust manifold which is connected to a cylinder head of an engine and directs exhaust gas to an exhaust pipe, a catalyst which renders the exhaust gas from the exhaust manifold harmless, and the like are heat sources generating high temperature heat. For preventing the heat from adversely affecting peripheral parts within an engine room, there has been hitherto known a structure in which the heat sources such as the exhaust manifold and catalyst are covered with a member which intercepts heat (Japanese Patent Laid-Open Publication Nos. 11-107772 and 2002-161739).

Figure 1:
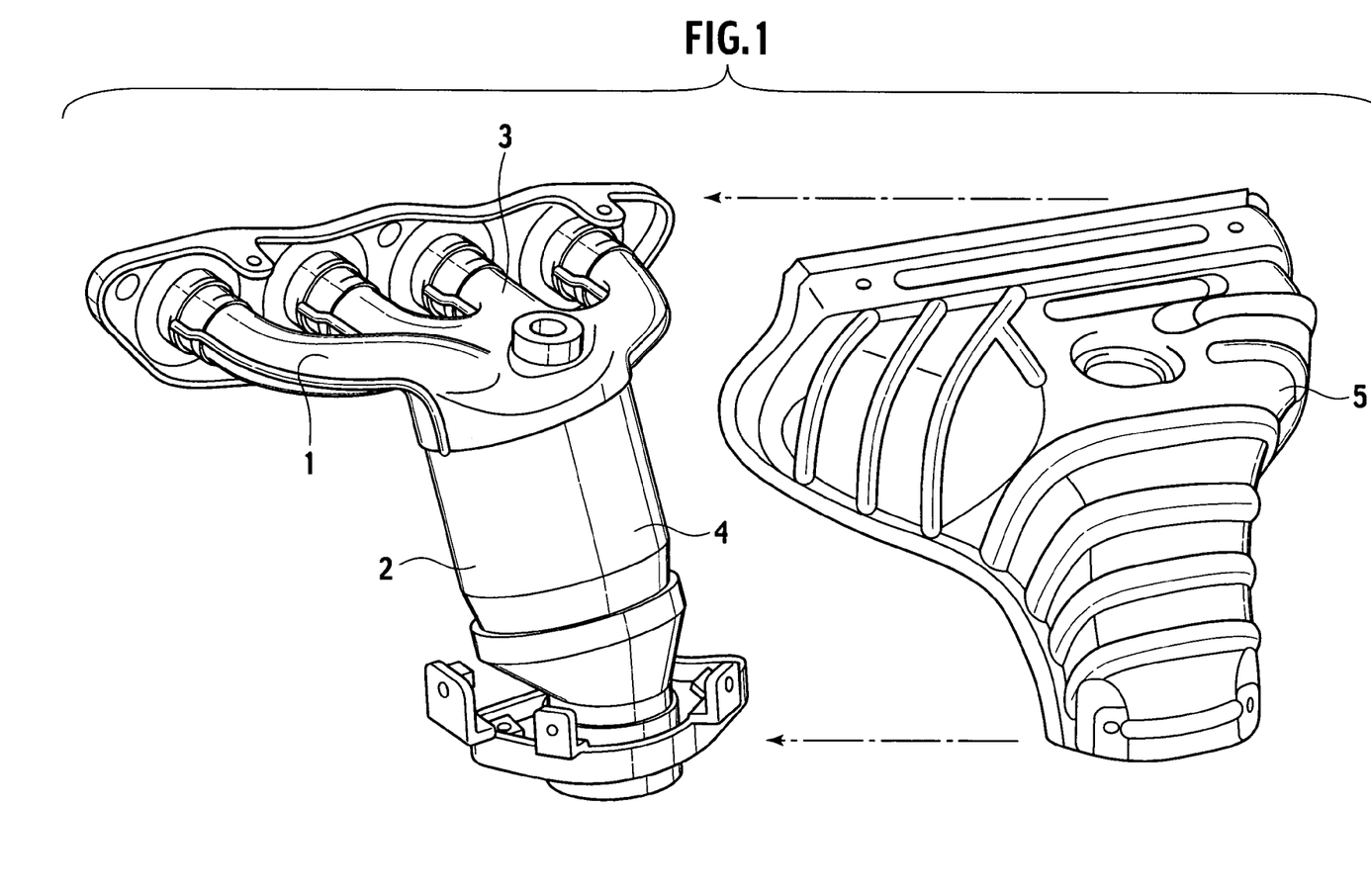
FIG. 1 is an exploded perspective view showing a conventional heat shield structure of an exhaust manifold and a catalyst.

As such a structure, the following one has been devised. As shown in FIG. 1, a catalyst 2 is arranged in the vicinity of an exhaust manifold 1, and both an upper surface 3 of the exhaust manifold 1 and an upper surface 4 of the catalyst 2 are covered with a single heat shield member 5.

SUMMARY OF THE INVENTION

Heat generated from the exhaust manifold and catalyst flows between the heat shield member and the exhaust manifold or catalyst toward the exhaust pipe side while a vehicle is moving. On the contrary, heat generated from the exhaust manifold and catalyst flows toward the engine side while the vehicle is stopped. However, in the structure shown in FIG. 1, heat from the exhaust manifold 1 and heat from the catalyst 2 are mixed within the heat shield member 5 either while the vehicle is moving or stopped, and the heat is not smoothly released, resulting in low heat radiation efficiency.

The present invention was made in the light of such a problem. An object of the present invention is to provide a heat shield structure of the exhaust manifold and catalyst which can efficiently release heat from the exhaust manifold and catalyst.

According to one aspect of the present invention, there is provided a heat shield structure of an exhaust manifold and a catalyst comprising: a flange which is provided in a connecting portion connecting the exhaust manifold and catalyst and forms an open channel; an exhaust manifold heat shield member which covers an upper surface of the exhaust manifold; and a catalyst heat shield member which covers an upper surface of the catalyst, wherein an open side of the channel faces to the catalyst's side, and a rear end of the exhaust manifold heat shield member is arranged on a vehicle body upper side of an end portion of the flange, and a front end of the catalyst heat shield member is arranged on a vehicle body floor side of the end portion of the flange.

BRIEF DESCRIPTION OF THE DRAWINGS

The invention will now be described with reference to the accompanying drawings wherein.

DETAILED DESCRIPTION OF THE PREFERRED EMBODIMENT

Figure 2:
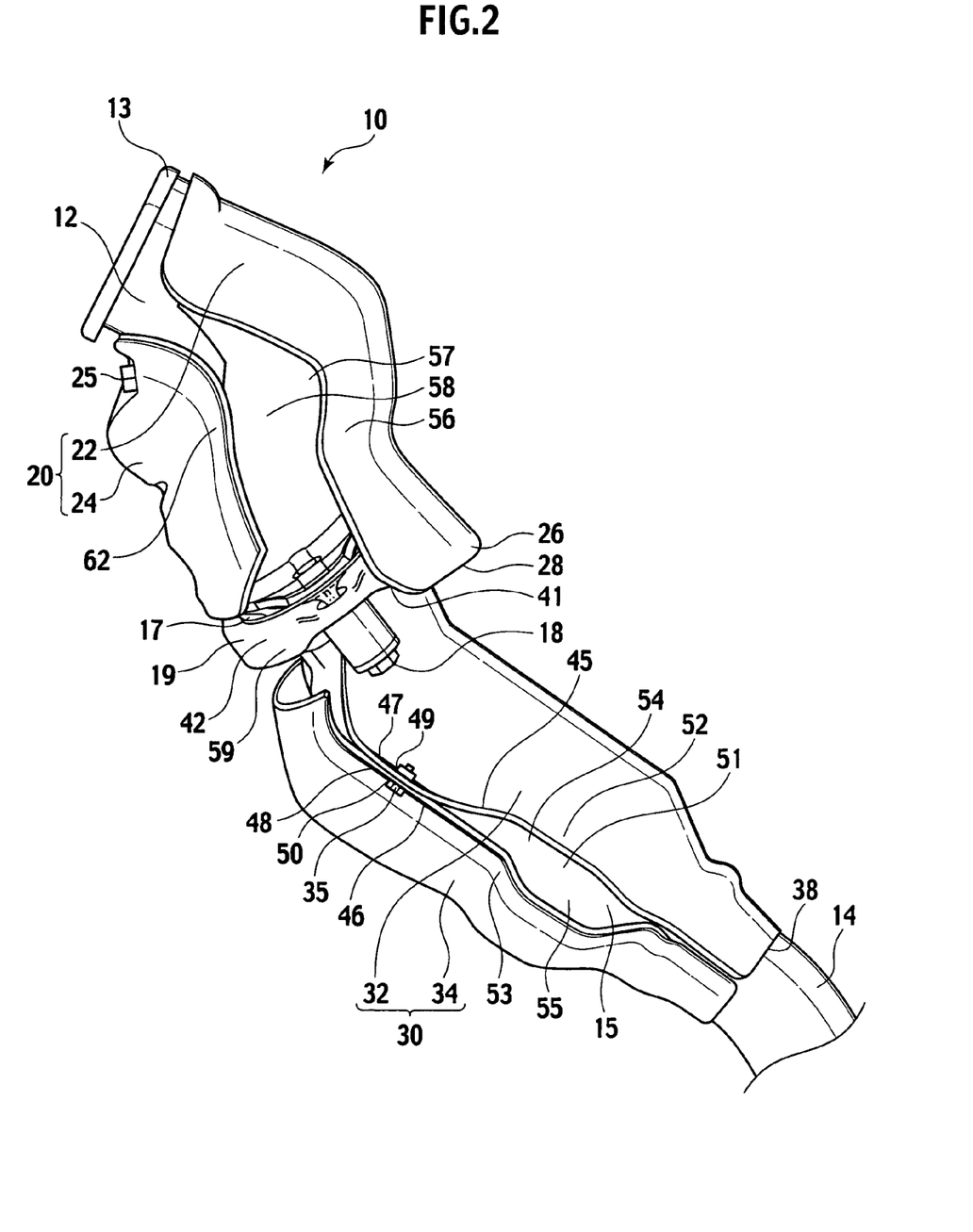
FIG. 2 is a side view showing a heat shield structure of an exhaust manifold and a catalyst according to an embodiment of the present invention.
Figure 3:
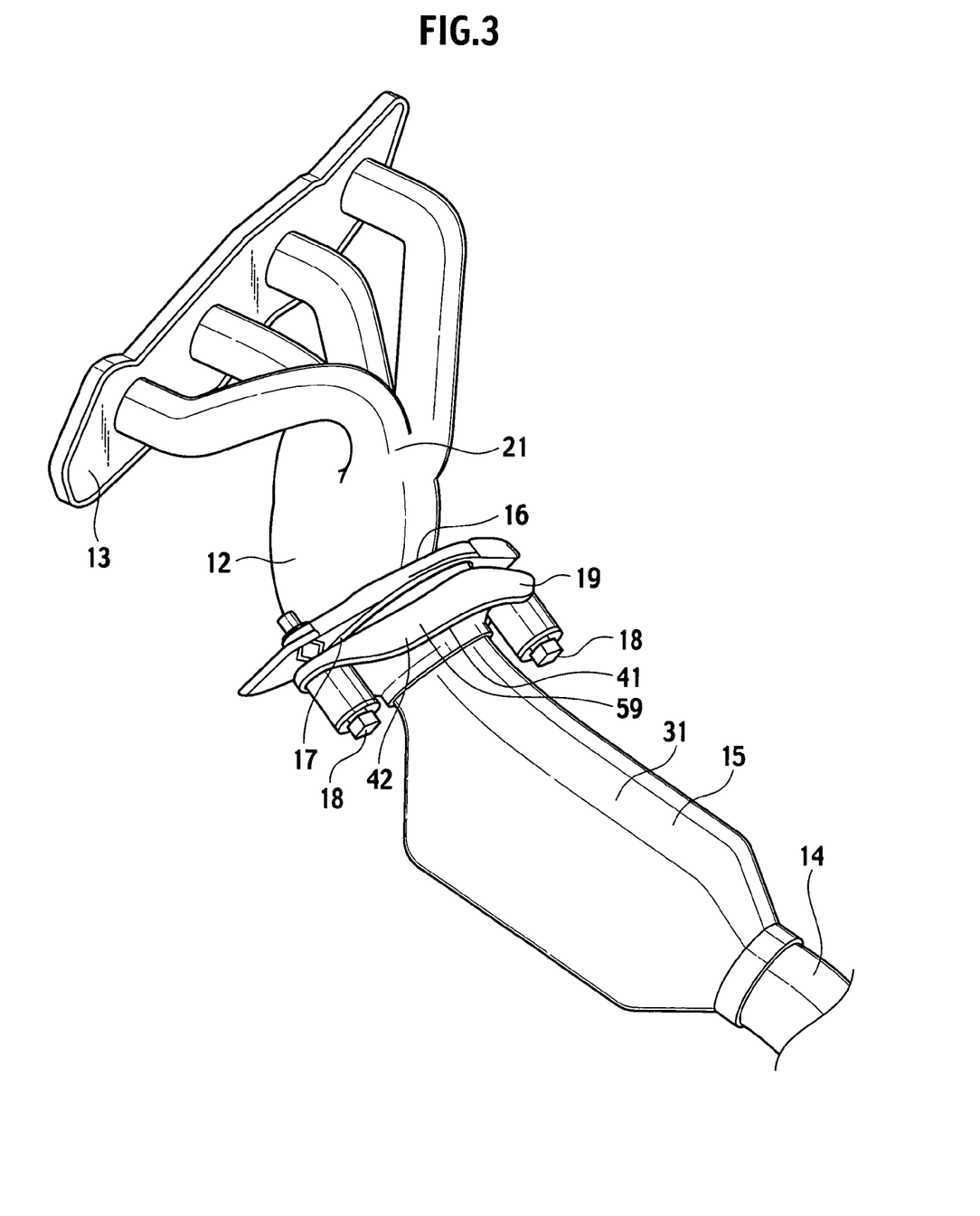
FIG. 3 is a perspective view showing the heat shield structure of FIG. 2 with a heat shield member removed.

Hereinafter, a description is given of an embodiment of the present invention with reference to the drawings. FIG. 2 shows a heat shield structure of an exhaust manifold and a catalyst according to the embodiment of the present invention, and FIG. 3 shows the heat shield structure of FIG. 2 with a heat shield member removed. In drawings, "UP" indicates an upper side of a vehicle body (vehicle body upper side), and "DOWN" indicates a floor side of the vehicle body (vehicle body floor side).

Figure 4:
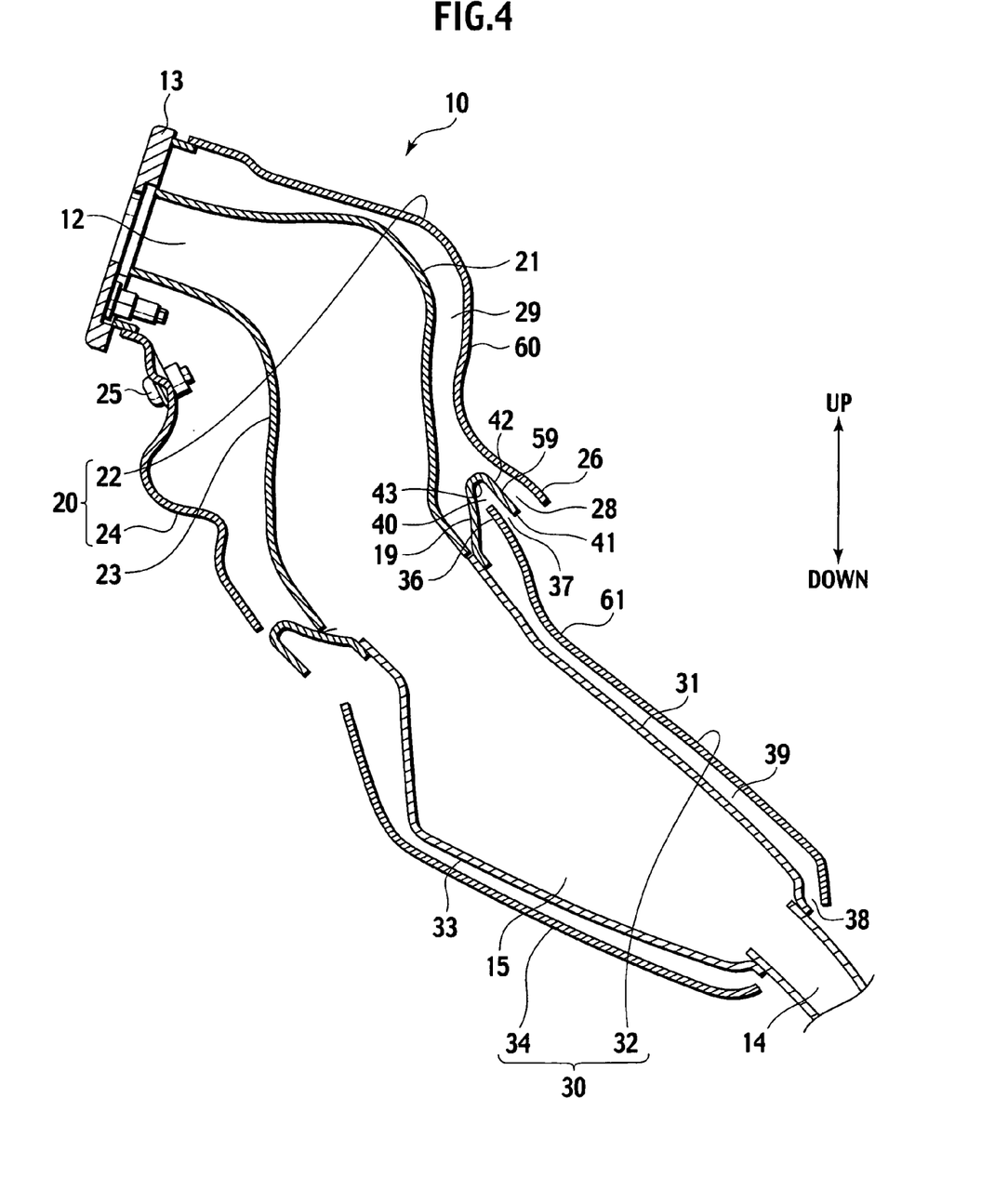
FIG. 4 is a cross-sectional view of the heat shield structure of FIG. 2.
Figure 7:
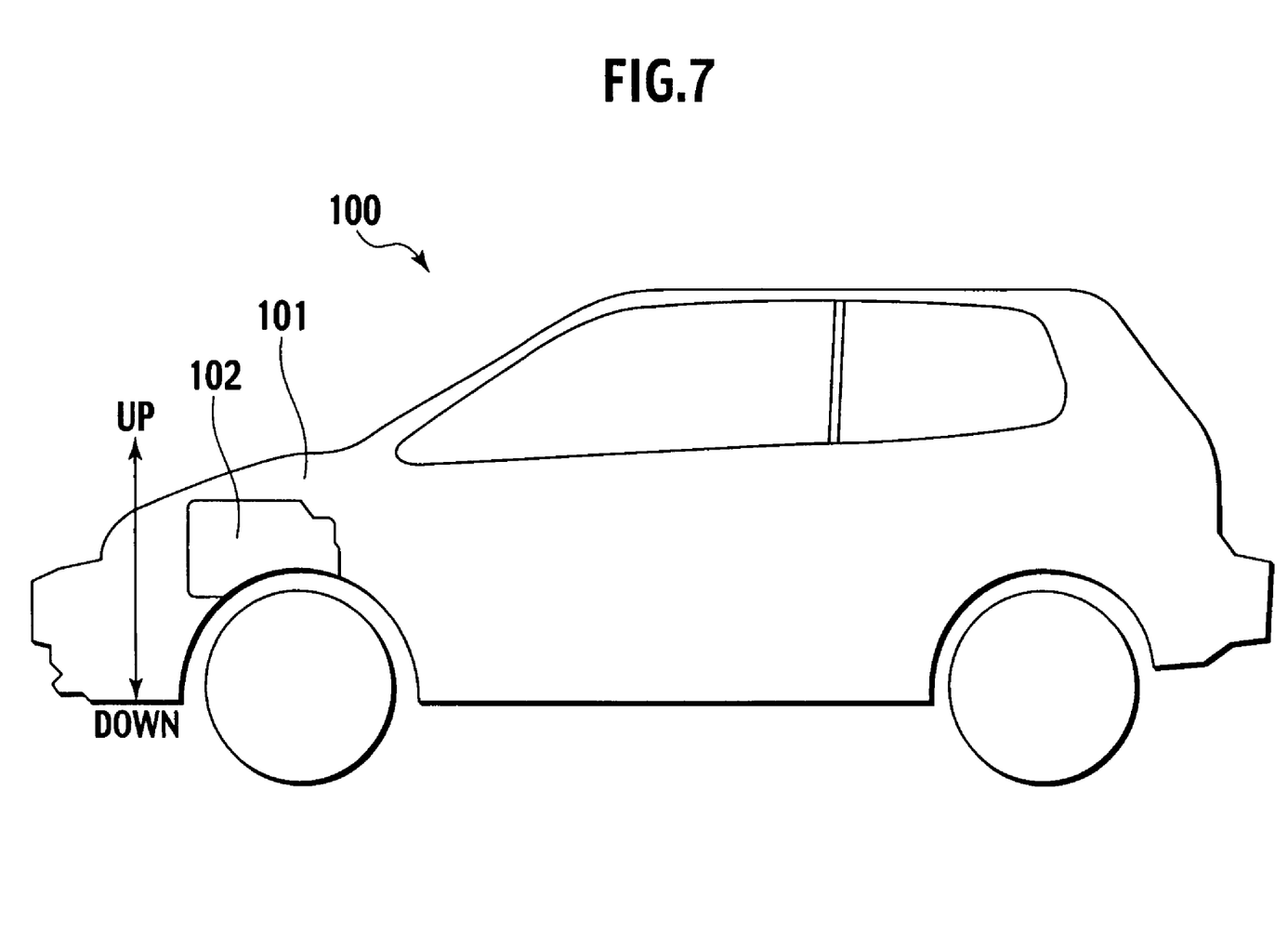
FIG. 7 is a side view showing a vehicle body which mounts an engine, the exhaust manifold, the catalyst and the heat shield structure.

As shown in FIGS. 2 and 7, a heat shield structure 10 of the exhaust manifold and catalyst is provided within a engine room 101 of a vehicle 100 or the like. A front end 13 of the exhaust manifold 12 is connected to a cylinder head of an engine 102, and the exhaust manifold 12 directs exhaust gas emitted from the engine 102 to an exhaust pipe 14. Between the exhaust manifold 12 and the exhaust pipe 14, a catalyst 15 is provided. The catalyst 15 renders the exhaust gas harmless and transmits the gas to the exhaust pipe 14. The catalyst 15 is connected to a rear end 16 of the exhaust manifold 12 and fixed with bolts 18 at a connecting portion 17. The exhaust manifold 12 and catalyst 15 connected to each other and the connecting portion 17 thereof are inclined downward (toward the vehicle body floor side) from the exhaust manifold 12 side to the exhaust pipe 14 side. As shown in FIG. 4, the exhaust manifold 12 is bent in the vicinity of the engine toward the vehicle body floor side, and the rear end 16 of the exhaust manifold 12, catalyst 15, and exhaust pipe 14 are inclined toward the vehicle body floor side. The connecting portion 17 is provided to connect these inclined exhaust manifold 12 and catalyst 15.

In this connecting portion 17, a bent flange 19 is provided. As shown in FIG. 4, this bent flange 19 is provided with a bent wall 59, which is bent so as to have a substantially U-shaped cross-section and extended substantially horizontal to the aforementioned inclination. The bent flange 19 forms an open channel 40, and an open side of the channel 40 faces to the exhaust pipe 14 side (catalyst 15 side). This bent flange 19 is fastened by the bolts 18, which fix the catalyst 15 to the exhaust manifold 12, together with the catalyst 15 and fixed to the connecting portion 17. Since the bent flange 19 has a substantially U-shaped cross section, the rigidity thereof is enhanced.

An exhaust manifold heat shield cover (exhaust manifold heat shield member) 20 includes an upper cover 22 covering an upper surface 21 of the exhaust manifold 12 and a lower cover 24 covering a lower surface 23 of the exhaust manifold 12. The upper and lower covers 22 and 24 are formed into shapes substantially along the upper and lower surfaces 21 and 23 of the exhaust manifold 12, respectively. As shown in FIG. 2, a side face 56 of the upper cover 22 is partially cut off to form a cut-off portion 57.

These upper and lower covers 22 and 24 are arranged opposite to each other so as to sandwich the exhaust manifold 12 above and below. The upper and lower covers 22 and 24 are fixed and attached to the exhaust manifold 12 by bolts 25. At this time, as shown in FIG. 4, the upper cover 22 extends over the bent flange 19. Further, a rear end 26 of the upper cover 22 is arranged on a vehicle body upper side of an end portion 41 of the bent flange 19 and is arranged on the exhaust pipe 14 side (catalyst 15 side) of the end portion 41. Thus, a rear aperture portion 28 is formed between the rear end 26 of the upper cover 22 and an outer surface 42 of the bent flange 19.

Between the upper cover 22 of the exhaust manifold heat shield cover 20 and the exhaust manifold 12, a gap is provided along a path of the exhaust gas flow. The gap communicates with the rear aperture portion 28 to constitute a heat radiation path 29. As shown in FIG. 2, a gap is provided by the cut-off portion 57 between the side face 56 of the upper cover 22 and a side face 62 of the lower cover 24. The gap forms a side aperture portion 58 on a side of the exhaust manifold heat shield cover 20. The side aperture portion 58 communicates with the heat radiation path 29.

Similar to the exhaust manifold heat shield cover 20, a catalyst heat shield cover (catalyst heat shield member) 30 includes an upper cover 32 covering an upper surface 31 of the catalyst 15 and a lower cover 34 covering a lower surface 33 of the catalyst 15. The upper and lower covers 32 and 34 are formed into shapes substantially along the upper and lower surfaces 31 and 33 of the catalyst 15, respectively. Side surfaces 52 and 53 of the upper and lower covers 32 and 34 are partially cut off to form cut-off portions 54 and 55, respectively. Flanges 47 and 48 are provided at side edges 45 and 46 of the upper and lower covers 32 and 34. The flanges 47 and 48 extend in a direction substantially perpendicular to the path of the exhaust gas flow. In the flanges 47 and 48, bolt holes 49 and 50, into which bolts 35 are inserted, are formed.

These upper and lower covers 32 and 34 are arranged opposite to each other so as to sandwich the catalyst 15 above and below. The upper and lower covers 32 and 34 are fixed to each other by the bolts 35 inserted through the bolt holes 49 and 50 of the flanges 47 and 48 abutting on each other, thus being attached to the catalyst 15. As shown in FIG. 4, a front end 36 of the upper cover 32 is arranged in the channel 40 of the bent flange 19. In other words, the front end 36 of the upper cover 32 is arranged on a vehicle body floor side of the end portion 41 of the bent flange 19 and is arranged on the exhaust manifold 12 side of the end portion 41. Thus, a front aperture portion 37 is formed between the front end 36 of the upper cover 32 and an inner surface 43 of the bent flange 19.

Between the upper cover 32 of the catalyst heat shield cover 30 and the catalyst 15, a gap is provided along the path of the exhaust gas flow and serves as a heat radiation path 39 in which the front aperture portion 37 communicates with a rear aperture portion 38. As shown in FIG. 2, there is a gap provided by the cut-off portions 54 and 55 in a part between opposite side faces of the upper and lower covers 32 and 34 to form a side aperture portion 51. The side aperture portion 51 communicates with the heat radiation path 39.

As described above, the rear end 26 of the upper cover 22 is arranged on the vehicle body upper side of the bent flange 19 while the front end 36 of the upper cover 32 is arranged in the channel 40 of the bent flange 19. Accordingly, the rear aperture portion 28 of the exhaust manifold heat shield cover 20 and the front aperture portion 37 of the catalyst heat shield cover 30 are separated by the outer and inner surfaces 42 and 43 of the bent flange 19, and the heat radiation paths 29 and 39 do not communicate with each other.

Figure 5:
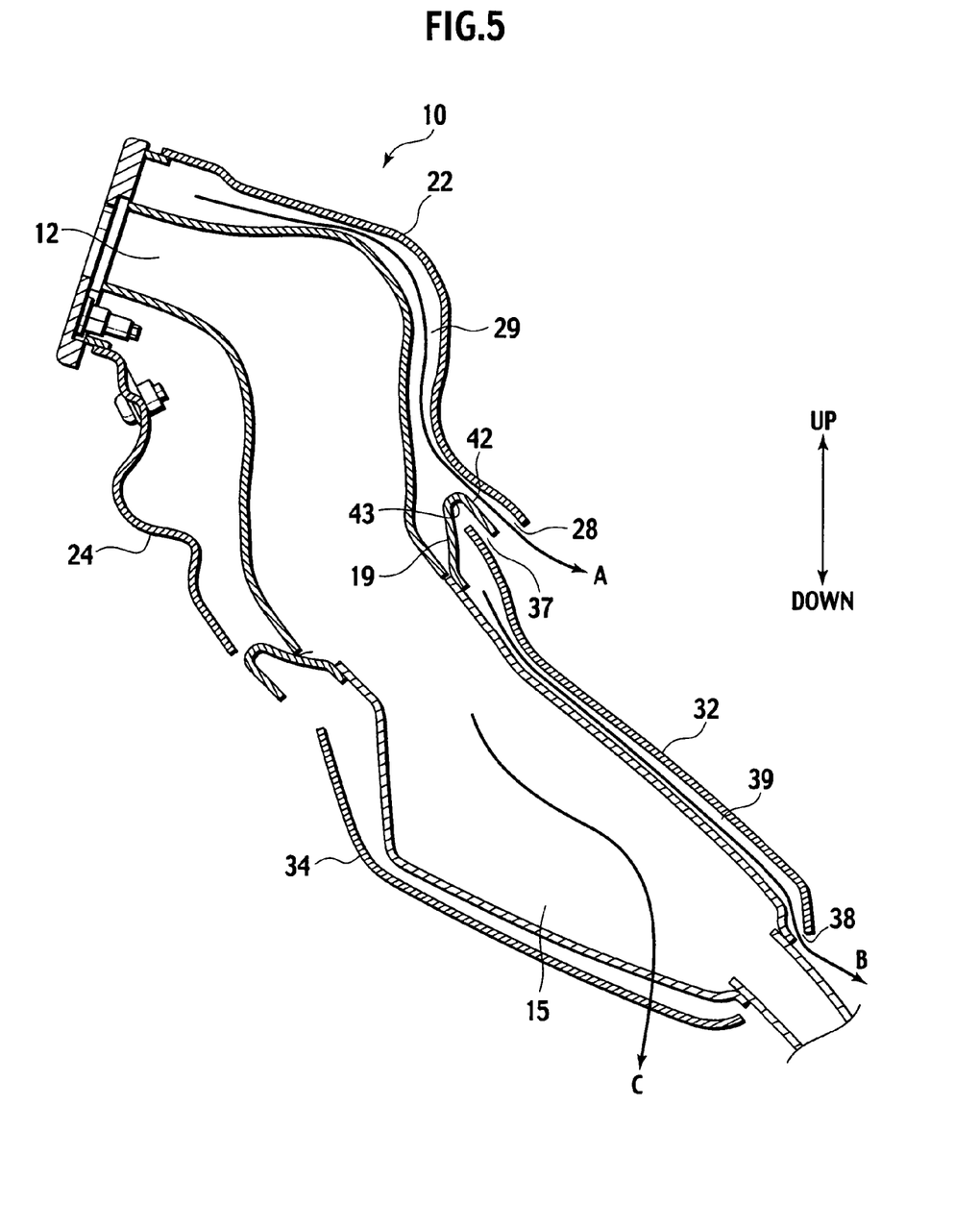
FIG. 5 is a cross-sectional view explaining a heat flow within the heat shield structure of FIG. 2 while a vehicle is moving.

In the heat shield structure 10 of the exhaust manifold and catalyst, heat flows toward the exhaust pipe 14 side while the vehicle is moving. Specifically, as shown in FIG. 5, heat generated from the exhaust manifold 12 passes through the heat radiation path 29 and is released from the rear aperture portion 28 to the outside (see an arrow A). Heat from the catalyst 15 passes through the heat radiation path 39 and is released from the rear aperture portion 38 and the side aperture portion 51 to the outside (see arrows B and C). At this time, as described above, the rear aperture portion 28 of the exhaust manifold heat shield cover 20 and the front aperture portion 37 of the catalyst heat shield cover 30 are separated by the outer and inner surfaces 42 and 43 of the bent flange 19, and the heat radiation paths 29 and 39 are disconnected from each other and do not communicate with each other. Accordingly, the heat from the exhaust manifold 12 does not enter the heat radiation path 39 and is not mixed with the heat from the catalyst 15.

Figure 6:
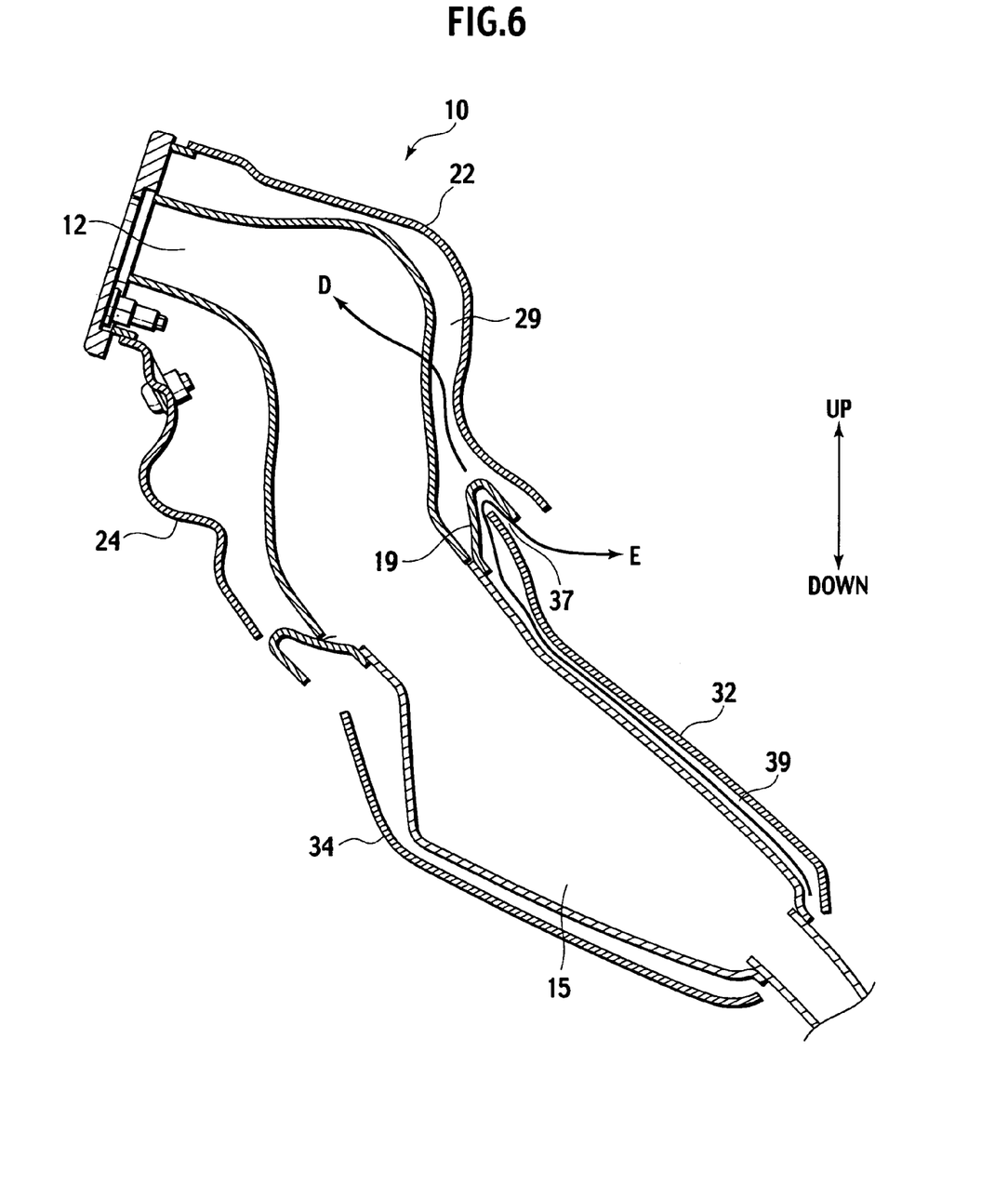
FIG. 6 is a cross-sectional view explaining the heat flow within the heat shield structure of FIG. 2 while the vehicle is stopped.

On the other hand, while the vehicle is stopped, heat flows toward the engine side. Specifically, as shown in FIG. 6, heat generated from the exhaust manifold 12 passes through the heat radiation path 29 and is released from the side aperture portion 58 to the outside (see an arrow D). Heat from the catalyst 15 passes through the heat radiation path 39 and is released from the front aperture portion 37 to the outside (see an arrow E). Similar to the case of the moving vehicle, the heat radiation paths 29 and 39 are disconnected from each other by the bent flange 19. Therefore, the heat from the catalyst 15 does not enter the heat radiation path 29 and is not mixed with the heat from the exhaust manifold 12.

In the heat shield structure 10 of the exhaust manifold and catalyst according to this embodiment, the rear end 26 of the upper cover 22 of the exhaust manifold heat shield cover 20 is arranged on the vehicle body upper side of the end portion 41 of the bent flange 19, and, moreover, the front end 36 of the upper cover 32 of the catalyst heat shield cover 30 is arranged on a vehicle body floor side of the end portion 41. The rear aperture portion 28 of the exhaust manifold heat shield cover 20 and the front aperture portion 37 of the catalyst heat shield cover 30 are separated by the outer and inner surfaces 42 and 43 of the bent flange 19, and the heat radiation paths 29 and 39 do not communicate with each other. Accordingly, heat from the exhaust manifold 12 and heat from the catalyst 15 are not mixed either when the vehicle is moving or stopped. Specifically, as indicated by the arrow A of FIG. 5 and the arrow D of FIG. 6, heat from the exhaust manifold 12 is released to the outside from the rear aperture portion 28 or the side aperture portion 58, and, as indicated by the arrows B and C of FIG. 5 and the arrow E of FIG. 6, heat from the catalyst 15 is released to the outside from the rear aperture portion 38, the side aperture portion 51, or the front aperture portion 37. Compared to the structure shown in FIG. 1, heat from the exhaust manifold 12 and heat from the catalyst 15 can be efficiently released without being mixed with each other.

In this heat shield structure 10 of the exhaust manifold and catalyst, the rear end 26 of the upper cover 22 of the exhaust manifold heat shield cover 20 is arranged on the exhaust pipe 14 side of the end portion 41 of the bent flange 19, and the front end 36 of the upper cover 32 of the catalyst heat shield cover 30 is arranged on the exhaust manifold 12 side of the end portion 41. Accordingly, the upper cover 22 and the upper cover 32 horizontally overlap each other with the bent wall 59 interposed therebetween. For example, when liquid such as water and oil flows down along the upper surface 60 of the upper cover 22, the liquid flowing down from the rear end 26 of the upper cover 22 drops on the upper surface 61 of the upper cover 32 and flows along the upper surface 61. Therefore, this liquid does not enter the heat radiation path 29 or 39 through the rear aperture portion 28 or front aperture portion 37 and not reach the exhaust manifold 12 or catalyst 15.

Furthermore, the side surfaces 52 and 53 of the upper and lower covers 32 and 34 are partially cut off to provide the side aperture portion 51 communicating with the heat radiation path 39. Accordingly, while the vehicle is moving, heat from the catalyst 15 passes through the heat radiation path 39 and is released not only from the rear aperture portion 38 but also from the side aperture portion 51. Therefore, heat can be efficiently released even though the catalyst 15 is covered with the catalyst heat shield cover 30 above and below. In the case of using a work tool to connect the exhaust manifold 12 and catalyst 15 or to change the catalyst 15 or exhaust pipe 14, space for such a work can be secured by the side aperture portion 51. The work is not obstructed by the catalyst heat shield cover 30 and can be easily carried out.

The present invention is not limited to the aforementioned embodiment. In the aforementioned embodiment, the rear end 26 of the upper cover 22 of the exhaust manifold heat shield cover 20 is arranged on the vehicle body upper side of the end portion 41 of the bent flange 19 and on the exhaust pipe 14 side of the end portion 41, and the front end 36 of the upper cover 32 of the catalyst heat shield cover 30 is arranged on a vehicle body upper side of the end portion 41 and on the exhaust manifold 12 side of the end portion 41. However, at least, the rear end 26 needs to be arranged on a vehicle body upper side of the end portion 41 while the front end 36 needs to be arranged on a vehicle body upper side of the end portion 41. In the heat shield structure 10 of the exhaust manifold and catalyst according to the embodiment, the rear end 26 is arranged on the exhaust pipe 14 side of the end portion 41, and the front end 36 is arranged on the exhaust manifold 12 side of the end portion 41. This makes it possible to obtain the aforementioned effect of preventing liquid from entering the heat radiation paths 29 and 39.

The entire content of a Japanese Patent Application No. P2004-058557 with a filing date of Mar. 3, 2004 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A heat shield structure of an exhaust manifold and a catalyst, comprising:
    a flange which is provided in a connecting portion connecting the exhaust manifold and the catalyst and forms an open channel;
    an exhaust manifold heat shield member which covers an upper surface of the exhaust manifold; and
    a catalyst heat shield member which covers an upper surface of the catalyst,
    wherein an open side of the channel faces to the catalyst's side,
    a rear end of the exhaust manifold heat shield member is arranged above an end portion of the flange and is arranged at a catalyst's side of the end portion of the flange, and
    a front end of the catalyst heat shield member is arranged under the end portion of the flange and is arranged at an exhaust manifold's side of the end portion of the flange.

2. A heat shield structure according to claim 1, wherein the exhaust manifold heat shield member covers a lower surface of the exhaust manifold, and a first aperture is formed in a side face of the exhaust manifold heat shield member.

3. A heat shield structure according to claim 1, wherein the catalyst heat shield member covers a lower surface of the catalyst, and a second aperture is formed in a side face of the catalyst heat shield member.

4. A heat shield structure according to claim 1, wherein the flange is bent so as to have a substantially U-shaped cross-section.

* * * * *